(12) United States Patent
Hinton et al.

(10) Patent No.: US 8,219,757 B2
(45) Date of Patent: Jul. 10, 2012

(54) APPARATUS AND METHOD FOR LOW TOUCH CACHE MANAGEMENT

(75) Inventors: Glenn Hinton, Portland, OR (US); Dale Juenemann, North Plains, OR (US); R. Scott Tetrick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 891 days.

(21) Appl. No.: 12/286,460

(22) Filed: Sep. 30, 2008

(65) Prior Publication Data

US 2010/0082906 A1 Apr. 1, 2010

(51) Int. Cl.
  *G06F 12/00* (2006.01)
(52) U.S. Cl. .................. 711/129; 711/E12.046
(58) Field of Classification Search .......... None
  See application file for complete search history.

(56) References Cited

U.S. PATENT DOCUMENTS

| 5,394,531 | A | * | 2/1995 | Smith | 711/136 |
| 5,499,354 | A | * | 3/1996 | Aschoff et al. | 711/129 |
| 6,839,809 | B1 | * | 1/2005 | Forster et al. | 711/134 |

* cited by examiner

Primary Examiner — Edward Dudek, Jr.
Assistant Examiner — John P Fishburn
(74) Attorney, Agent, or Firm — Jordan IP Law, PC

(57) ABSTRACT

In some embodiments, a processor-based system includes a processor, a system memory coupled to the processor, a mass storage device, a cache memory located between the system memory and the mass storage device, and code stored on the processor-based system to cause the processor-based system to utilize the cache memory. The code may be configured to cause the processor-based system to preferentially use only a selected size of the cache memory to store cache entries having less than or equal to a selected number of cache hits. Other embodiments are disclosed and claimed.

19 Claims, 8 Drawing Sheets

APPARATUS AND METHOD FOR LOW TOUCH CACHE MANAGEMENT

The invention relates to cache utilization. More particularly, some embodiments of the invention relate to an apparatus and method for utilizing a multi-level non-volatile cache in an electronic system such as a processor-based system.

BACKGROUND AND RELATED ART

Many electronic systems benefit from the use of cache memory. In some electronic systems, driver software may be provided to utilize cache memories.

In a white paper published at ftp://download.intel.com/design/flash/NAND/turbomemory/whitepaper.pdf, a white paper describes Intel® Turbo Memory as consisting of an Intel Turbo Memory controller ASIC (Application Specific Integrated Circuit) chip and two Intel NAND flash non-volatile memory components that enable faster resume to productivity after hibernate, providing additional power savings by limiting hard disk drive accesses and increasing application responsiveness for a richer user experience.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
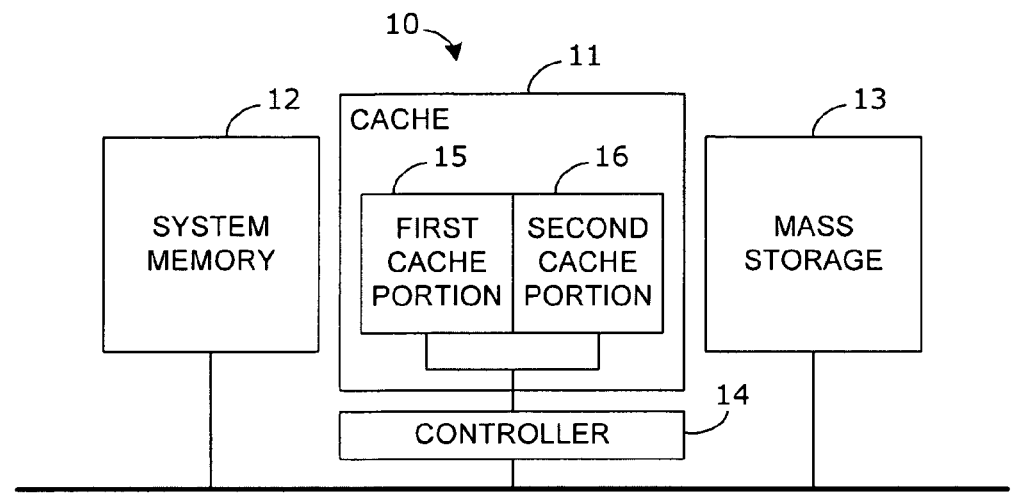
FIG. 1 is a block diagram of an electronic system in accordance with some embodiments of the invention.

With reference to FIG. 1, an electronic system 10 includes a cache memory 11 located between a system memory 12 and a mass storage device 13. A controller 14 is coupled the cache memory 11. The controller 14 may configured to preferentially use only a selected size of the cache memory 11 to store cache entries having less than or equal to a selected number of cache hits. For example, the cache memory 11 may be logically divided into at least a first cache portion 15 corresponding to the selected size, the first cache portion 15 to preferentially store cache entries having less than or equal to a selected number of cache hits, and a second cache portion 16, the second cache portion 16 to preferentially store cache entries having more than the selected number of cache hits. For example, the controller 14 may be configured to preferentially store a new cache entry in the first cache portion 15.

Access requests to the mass storage device 13 may correspond to either a read access or a write access. For example, the controller 14 may be an integrated part of the cache memory device 11 or may be located elsewhere in the electronic system 10 and coupled to the cache memory 11 by a bus or other electronic connection.

In some embodiments, the controller 14 may be further configured to promote a cache entry from the first cache portion 15 to the second cache portion 16 when the number of hits for the cache entry exceeds the selected number of cache hits. For example, the selected number of cache hits may be one cache hit. In some embodiments, the controller may be configured to select whether to store a next new cache entry in the first cache portion 15 or the second cache portion 16 in advance of a next input/output request.

For example, in some embodiments of the electronic system 10 the cache memory 11 may be further logically divided into at least a third cache portion to preferentially store cache entries having at least a second selected number of cache hits, the second selected number of cache hits being greater than the selected number of cache hits for the first and second cache portions 15, 16. For example, in some embodiments, the cache memory 11 may include a non-volatile cache memory.

Figure 2:
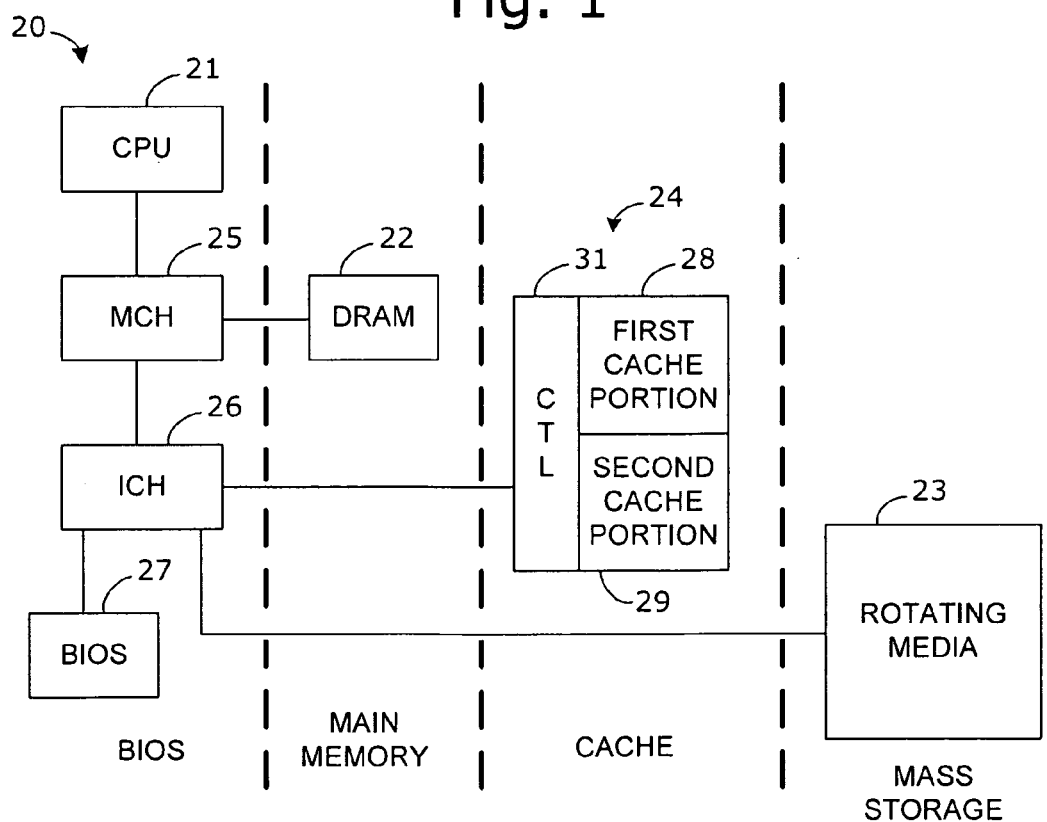
FIG. 2 is a block diagram of a processor-based system in accordance with some embodiments of the invention.

With reference to FIG. 2, a processor-based system 20 may include a processor 21, a system memory 22 coupled to the processor 21, a mass storage device 23, and a cache memory 24 located between the system memory 22 and the mass storage device 23. For example, the processor 21 may be a central processing unit (CPU). For example, the system memory 22 may be a dynamic random access memory (DRAM). For example, the system memory 22 may be coupled to the processor 21 via a memory controller hub (MCH) 25. For example, the mass storage device 23 may be a rotating media such as a hard disk drive or an optical disk drive. For example, the mass storage device 23 may be a non-rotating media such as a solid-state drive. For example, both the cache 24 and the mass storage device 23 may be coupled to the MCH via an input/output controller hub (ICH) 26.

The processor-based system 20 may further include code stored on the processor-based system 20 to cause the processor-based system to utilize the cache memory 24. For example, the code may be stored on the mass storage device 23, the system memory 22, or another memory or storage device coupled to the processor-based system 20. For example, the code may be stored as part of a basic input/output system (BIOS) 27 coupled to the ICH 26. For example, the code may be configured to cause the processor-based system 20 to preferentially use only a selected size of the cache memory to store cache entries having less than or equal to a selected number of cache hits.

In some embodiments of the processor-based system 20, the cache memory 24 may be logically divided into at least a first cache portion 28 corresponding to the selected size, the first cache portion 28 to preferentially store cache entries having less than or equal to a selected number of cache hits, and a second cache portion 29, the second cache portion 29 to preferentially store cache entries having more than the selected number of cache hits. For example, the code may be configured to cause the processor-based system 20 to preferentially store a new cache entry in the first cache portion 28.

In some embodiments, the code may be further configured to cause the processor-based system to promote a cache entry from the first cache portion 28 to the second cache portion 29 when the number of hits for the cache entry exceeds the selected number of cache hits. For example, the selected number of cache hits may be one cache hit. In some embodiments of the processor-based system 20, the code may be configured to cause the processor-based system to select whether to store a next new cache entry in the first cache portion or the second cache portion in advance of a next input/output request.

In some embodiments of the processor-based system 20, the cache memory 24 may be further logically divided into at least a third cache portion to preferentially store cache entries having at least a second selected number of cache hits, the second selected number of cache hits being greater than the selected number of cache hits for the first and second cache portions 28, 29. For example, the cache memory 24 may include a non-volatile cache memory.

Figure 3:
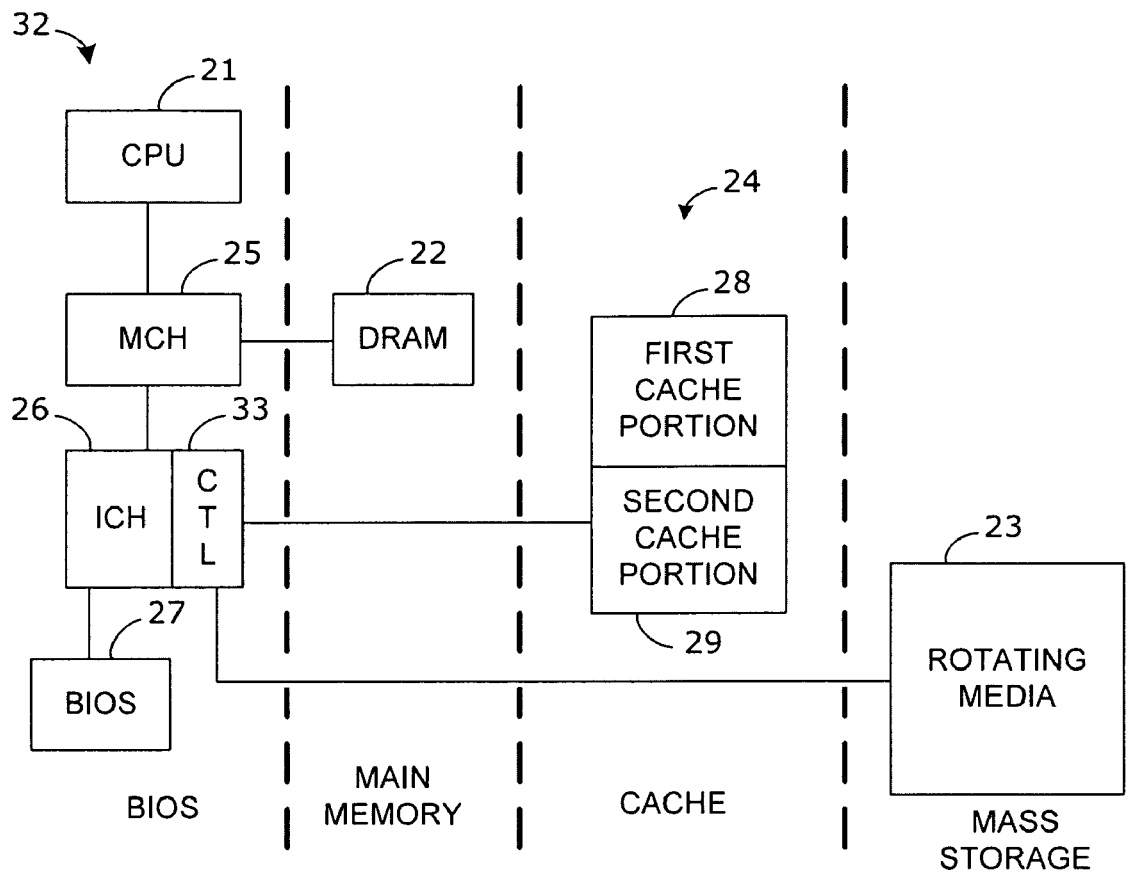
FIG. 3 is a block diagram of another processor-based system in accordance with some embodiments of the invention.

For example, in some embodiments of the processor-based system 20, all or a portion of the code may be implemented by or executed by a controller 31 which may be integrated with the cache memory 24. Alternatively, with reference to FIG. 3, some embodiments of a processor-based system 32 may include a controller 33 located elsewhere in the processor-based system 32 and coupled to the cache memory 24 by a bus or other electronic connection. For example, the controller 33 may be integrated with the ICH 26.

Advantageously, a multi-partition logical cache partitioning and management algorithm in accordance with some embodiments of the invention may enhance I/O caching efficiency. For example, some embodiments of the invention may enable higher cache efficiency and/or hit rate. Fundamentally, caching works more effectively when there is data reuse. However, an I/O trace from actual usage may show that there is a variety of 'one touch' I/O data which may be of no benefit to place in a cache. Examples of this type of 'one touch' data may be new application installs or media downloads from cameras or USB flash drives onto the disk. Advantageously, the multi-partition caching scheme according to some embodiments of the invention may mitigate this problem by only allowing a fraction of the cache to be used by such transient data. For example, the fraction may correspond to a selected size of one half (50%), one quarter (25%), or some other selected fractional portion of the full size of the cache memory. In accordance with some embodiments, the selected size may vary during operation. For example, the selected size may be decreased and/or increased during operation of the cache memory. For example, the selected cache size may vary between a desired minimum partition size and a desired maximum partition size in accordance with the particular access requests to the mass storage device.

Some embodiments of the invention may provide an enhanced mechanism complementary to conventional techniques. For example, in some embodiments of the invention the cache policy (e.g. implemented in software) may not only make the cache insertion decisions but also specify where the data will go in the cache by selecting a next victim cacheline within the appropriate cache logical partition in advance, and managing additional cacheline state to track cacheline membership within these partitions. For example, information relating to a number of hits for a cache entry, a cacheline state, and/or a cacheline membership may be stored in metadata. For example, metadata may be stored in the cache memory itself, or elsewhere in the system.

Figure 4:
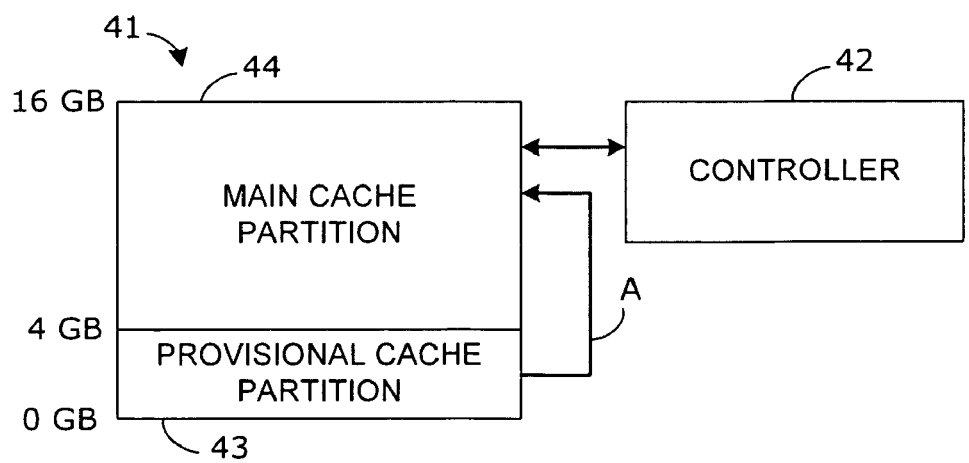
FIG. 4 is a block diagram of a cache memory system in accordance with some embodiments of the invention.

With reference to FIG. 4, a non-volatile cache memory device may include a partitioned non-volatile cache memory 41 configured to be located between a system memory and a mass storage device of an electronic system, and a controller 42 coupled to the partitioned non-volatile cache memory 41. For example, the controller 42 may be configured to control utilization of the partitioned non-volatile cache memory 41. In some embodiments of the invention, the partitioned non-volatile cache memory 41 may include a provisional cache partition 43 and a main cache partition 44. For example, the controller 42 may be configured to preferentially store a new cache entry in the provisional cache partition 43.

In some embodiments of the invention, an initial size of the provisional cache partition 43 may be selected to be less than fifty percent (50%) of a total size of the partitioned non-volatile cache memory 41. For example, a particular configuration may provide 16 gigabytes (GB) of total non-volatile cache memory capacity, with a 4 GB provisional cache partition (e.g. 25%). For example, the initially selected size for the provisional partition may grow or shrink during operation.

For example, in some embodiments of the non-volatile cache memory device the controller 42 may be further configured to preferentially store cache entries having less than or equal to a selected number of cache hits in the provisional cache partition 43. For example, the selected number of cache hits may be one cache hit. Alternatively, in some embodiments of the invention the selected number of cache hits may be two cache hits or some other number of cache hits corresponding, for example, to a low touch rate for the electronic system.

In some embodiments of the non-volatile cache memory device, the controller 42 may be further configured to promote a cache entry from the provisional cache partition 43 to the main cache partition 44 when the number of hits for the cache entry exceeds the selected number of cache hits. The arrow A represents how a cacheline may be promoted after being accessed more than once (or the selected number of accesses). In some embodiments of the non-volatile cache memory device, the controller 42 may be further configured to select whether to store a next new cache entry in the provisional cache partition 43 or the main cache partition 44 in advance of a next input/output request. For example, by preferentially selecting a next victim cacheline from the provisional cache, lower touch cache entries may be preferentially evicted from the cache memory while higher touch cache entries may be preferentially retained.

As illustrated in connection with the embodiment of FIG. 4, a non-volatile memory disk cache may be logically partitioned into two segments, namely the main cache and the provisional cache. Preferably, new cache insertions (or allocations) are done in the provisional cache (with some exceptions noted herein). For a 'one touch' provisional cache, if the cacheline is accessed again it is promoted to the main cache. For example, software may actively manage the size of the provisional cache by working to keep a desired ratio of provisional cache size to main cache size. In some embodiments of the invention, promotion may involve actual transfer of data from one partition to another partition. Alternatively, in some embodiments of the invention promotion will only involve a logical re-assignment from one partition to another partition (e.g. by updating cacheline membership metadata), in which case the relative sizes of the partitions changes during operation.

Figure 5:
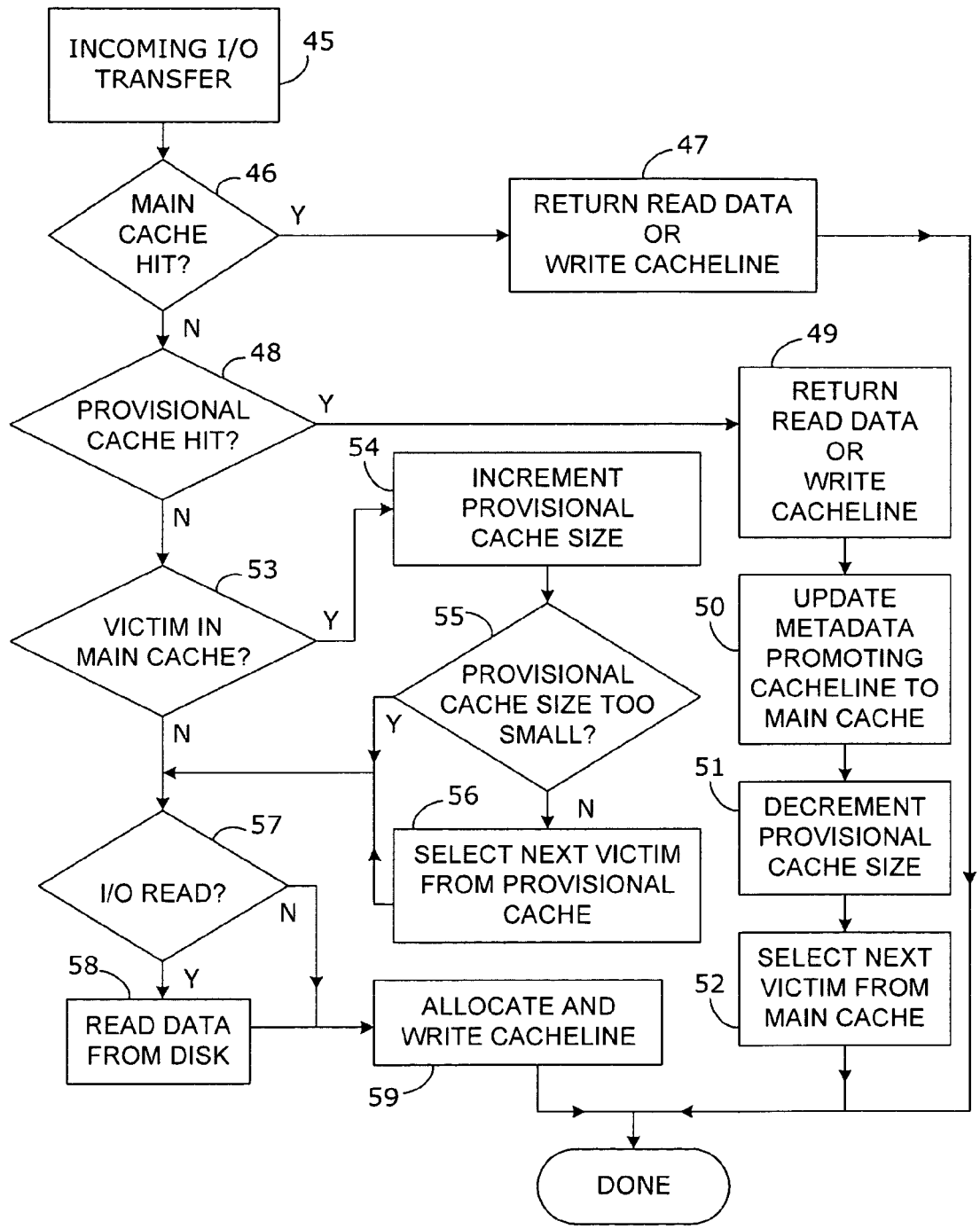
FIG. 5 is a flow diagram in accordance with some embodiments of the invention.

For example, with reference to FIG. 5, an incoming I/O transfer may initiate an access to a mass storage device (e.g. at block 45). As I/O reads and writes are directed toward Logical Block Addresses (LBAs) on the system hard disk, cache management device driver software examines the cache for hit or miss. Upon a hit in the main cache, the cache data is updated on a write or sourced for a read. For example, if a main cache hit is detected (e.g. at block 46), a return of read data or a write of the cacheline will result (e.g. at block 47).

A hit in the provisional cache also results in data being updated on writes and sourced on reads, but additionally the cacheline is now promoted into the main cache partition. This will cause the provisional cache region to shrink and the main cache to grow as cachelines are promoted into the main cache. For example, if a provisional cache hit is detected (e.g. at block 48), a return of read data or a write of the cacheline will result (e.g. at block 49) and metadata may be updated promoting the cacheline to the main cache (e.g. at block 50). Thereafter, the provisional cache size may be decremented (e.g. at block 51) and the next victim cacheline may be selected from the main cache (e.g. at block 52).

When a miss occurs, the victim line is normally selected from the provisional cache area, unless the provisional cache size is below some threshold, then the victim line will be selected from the main cache. This may continue until the provisional cache has grown back above some threshold then victim lines will again be selected from the provisional cache. The relative sizes of the main cache and provisional cache are variable and can be managed by software to some desired point based on, for example, workload.

For example, if the victim cacheline is in the main cache (e.g. at block 53) the provisional cache size may be incremented (e.g. at block 54). If the provisional cache size is not too small (e.g. greater than a desired minimum provisional cache size at block 55), a next victim cacheline may be selected from the provisional cache (e.g. at block 56). If the request is an I/O read (e.g. at block 57), data is read from the disk (e.g. at block 58). Thereafter, the cacheline is allocated and written (e.g. at block 59), to either the provisional cache or the main cache in accordance with the selected victim cacheline.

Figure 6:
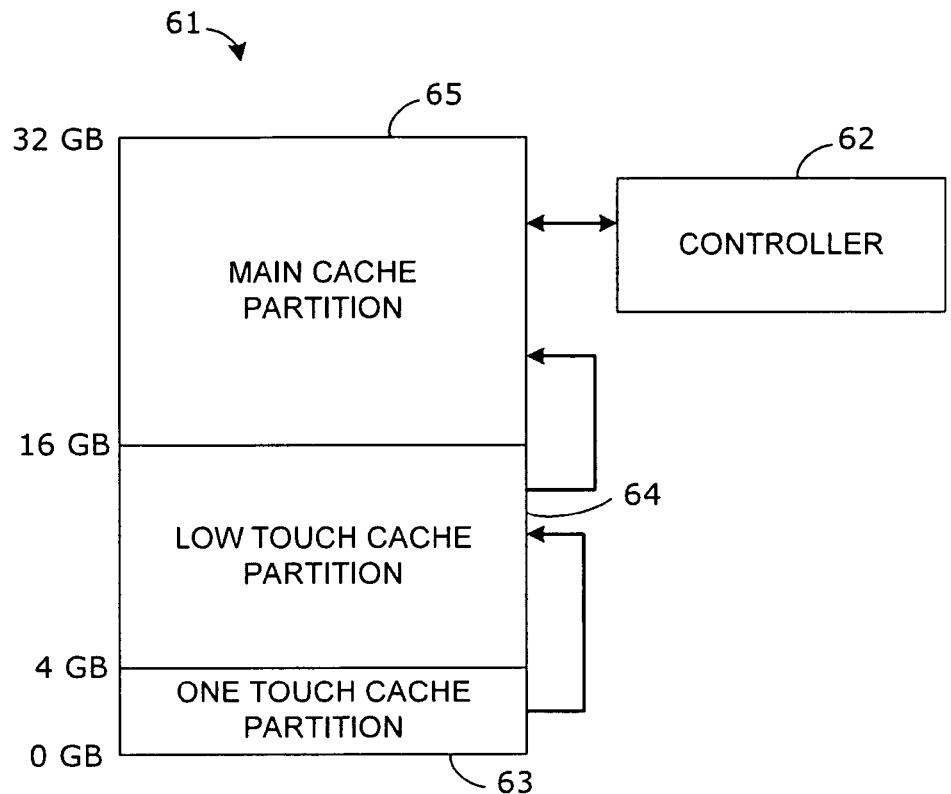
FIG. 6 is a block diagram of another cache memory system in accordance with some embodiments of the invention.

With reference to FIG. 6, in some embodiments of the invention a cache memory device may have more than two logical partitions, with each successive partition configured to store relatively higher touch cache entries. For example, a processor-based system may include a cache memory 61 configured to be located between a system memory and a mass storage device. The cache memory 61 may be coupled to a controller 62, where the controller is configured to utilize the cache memory 61 in the processor-based system (e.g. similar to the processor-based system described in connection with FIG. 3). For example, the controller 62 may be configured to preferentially use only a selected size of the cache memory 61 to store cache entries having less than or equal to a selected number of cache hits.

In some embodiments of the invention, the cache memory 61 may be logically divided into at least a first cache portion 63 corresponding to a first selected size, the first cache portion 63 to preferentially store cache entries having less than or equal to a first selected number of cache hits and a second cache portion 64, the second cache portion 64 to preferentially store cache entries having more than the first selected number of cache hits. For example, the second cache portion 64 may preferentially store cache entries having less than or equal to a second selected number of cache hits, where the second selected number of cache hits is greater than the first selected number of cache hits. For example, the controller 62 may be configured to preferentially store a new cache entry in the first cache portion 63.

In some embodiments of the invention, the cache memory 61 is further logically divided into at least a third cache portion 65 to preferentially store cache entries having at least a third selected number of cache hits, the third selected number of cache hits being greater than both the first and second selected number of cache hits for the first and second cache portions 63, 64. For example, the first cache portion 63 may correspond to a one touch cache partition with a first selected number of hits being equal to one cache hits. For example, the second cache portion 64 may correspond to a low touch cache partition with a second selected number of hits being equal to three cache hits. For example, the third cache portion 65 may correspond to a main cache partition with a selected number of cache hits being four cache hits or greater.

For example, the controller 62 may be further configured to promote a cache entry from the first cache portion 63 to the second cache portion 64 when the number of hits for the cache entry exceeds the first selected number of cache hits. For example, the controller 62 may be further configured to promote a cache entry from the second cache portion 64 to the third cache portion 65 when the number of hits for the cache entry exceeds the second selected number of cache hits. For example, the controller 62 may be configured to select whether to store a next new cache entry in the first cache portion 63, the second cache portion 64, or the third cache portion 65 in advance of a next input/output request. For example, the cache memory 61 may include a non-volatile cache memory.

Figure 7:
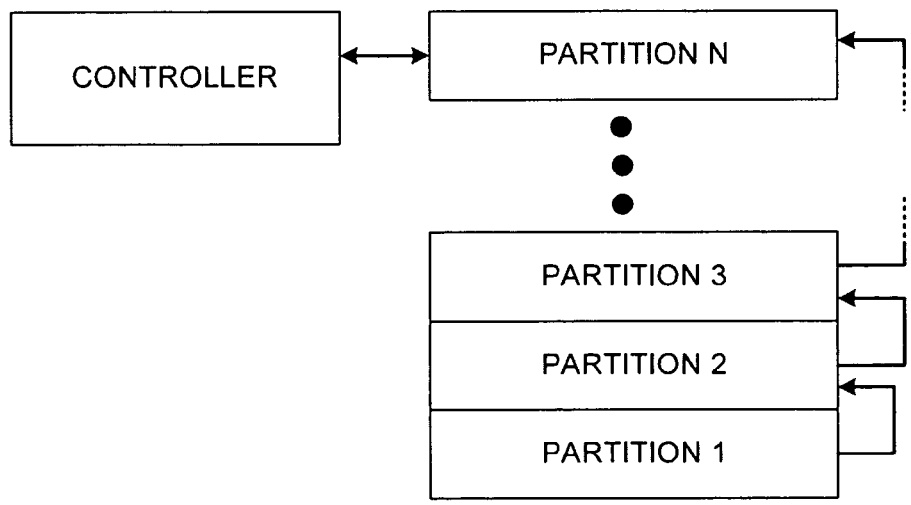
FIG. 7 is a block diagram of another cache memory system in accordance with some embodiments of the invention.

With reference to FIG. 7, in some embodiments of the invention a cache memory device may have N logical partitions, where N is more than 1. For example, each successive partition may be configured to preferentially store relatively higher touch cache entries. For example, a cache entry may be promoted to a next higher successive partition if a number of hits for the cache entry exceeds a desired number of hits for the cache entries current partition. For example, a next victim cacheline may be preferentially selected from a lowest available cache partition.

Figure 8:
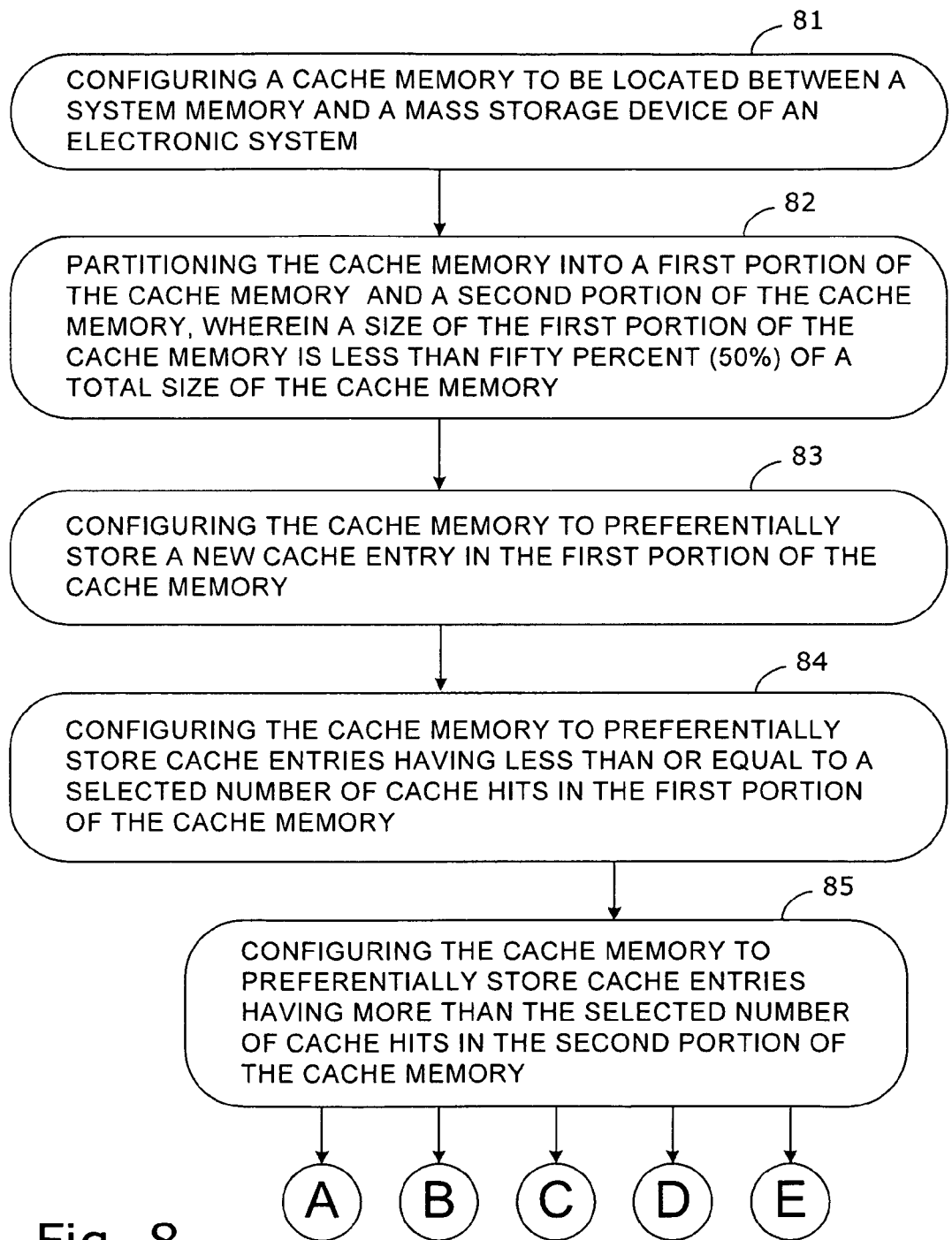
FIG. 8 is another flow diagram in accordance with some embodiments of the invention.
Figure 9:
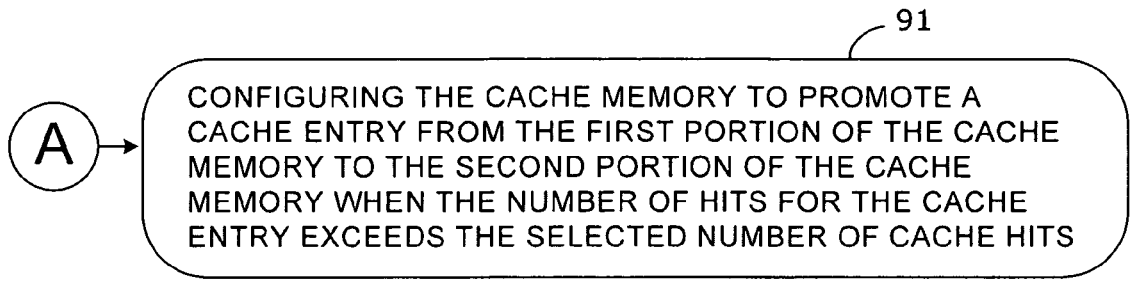
FIG. 9 is another flow diagram in accordance with some embodiments of the invention.
Figure 10:
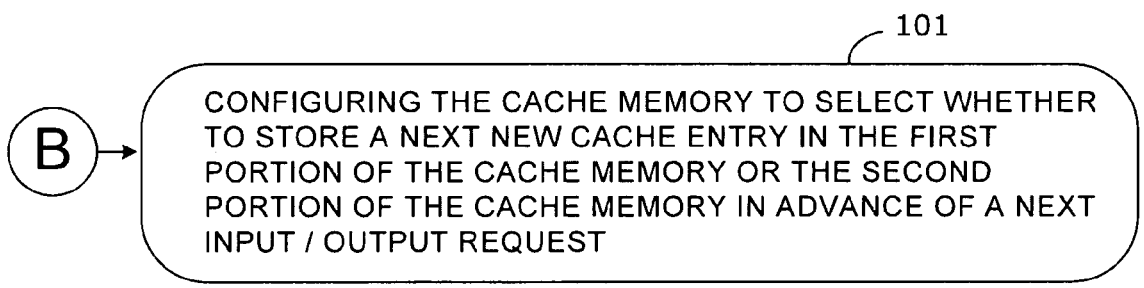
FIG. 10 is another flow diagram in accordance with some embodiments of the invention.
Figure 11:
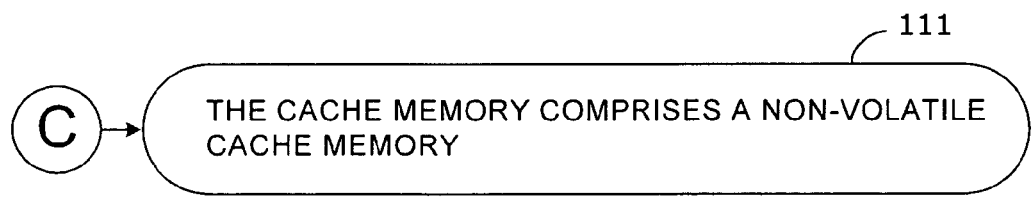
FIG. 11 is another flow diagram in accordance with some embodiments of the invention.
Figure 12:
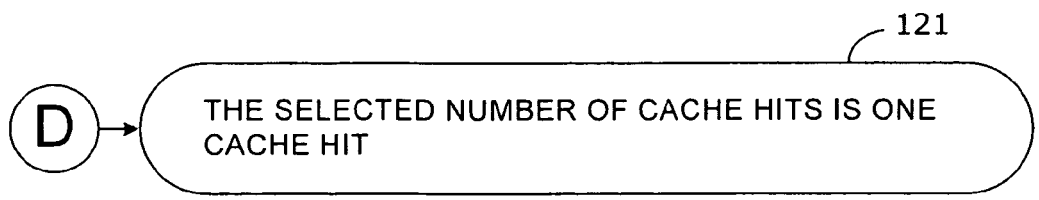
FIG. 12 is another flow diagram in accordance with some embodiments of the invention.

With reference to FIG. 8, in accordance with some embodiments of the invention a method of utilizing a cache memory includes configuring a cache memory to be located between a system memory and a mass storage device of an electronic system (e.g. at block 81), partitioning the cache memory into a first portion of the cache memory and a second portion of the cache memory, wherein a size of the first portion of the cache memory is less than fifty percent (50%) of a total size of the cache memory (e.g. at block 82), configuring the cache memory to preferentially store a new cache entry in the first portion of the cache memory (e.g. at block 83), configuring the cache memory to preferentially store cache entries having less than or equal to a selected number of cache hits in the first portion of the cache memory (e.g. at block 84), and configuring the cache memory to preferentially store cache entries having more than the selected number of cache hits in the second portion of the cache memory (e.g. at block 85).

With reference to FIGS. 9 to 12, some embodiments of the invention may further involve configuring the cache memory to promote a cache entry from the first portion of the cache memory to the second portion of the cache memory when the number of hits for the cache entry exceeds the selected number of cache hits (e.g. at block 91) and/or configuring the cache memory to select whether to store a next new cache entry in the first portion of the cache memory or the second portion of the cache memory in advance of a next input/output request (e.g. at block 101). For example, the cache memory may comprise a non-volatile cache memory (e.g. at block 111). For example, the selected number of cache hits may be one cache hit (e.g. at block 121).

Figure 13:
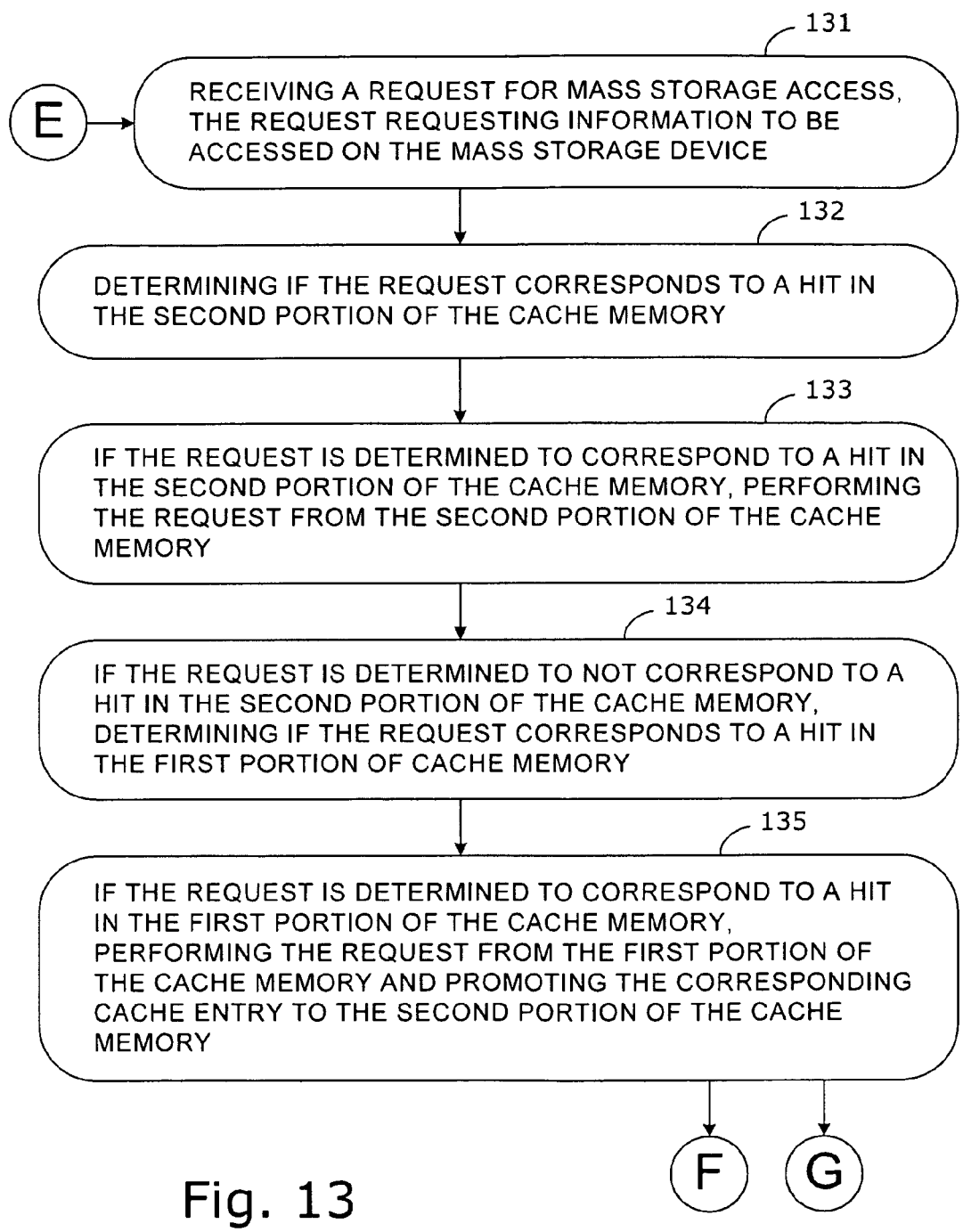
FIG. 13 is another flow diagram in accordance with some embodiments of the invention.

With reference to FIG. 13, some embodiments of the invention may further include receiving a request for mass storage access, the request requesting information to be accessed on the mass storage device (e.g. at block 131), determining if the request corresponds to a hit in the second portion of the cache memory (e.g. at block 132), if the request is determined to correspond to a hit in the second portion of the cache memory, performing the request from the second portion of the cache memory (e.g. at block 133), if the request is determined to not correspond to a hit in the second portion of the cache memory, determining if the request corresponds to a hit in the first portion of cache memory (e.g. at block 134), and if the request is determined to correspond to a hit in the first portion of the cache memory, performing the request from the first portion of the cache memory and promoting the corresponding cache entry to the second portion of the cache memory (e.g. at block 135).

Figure 14:
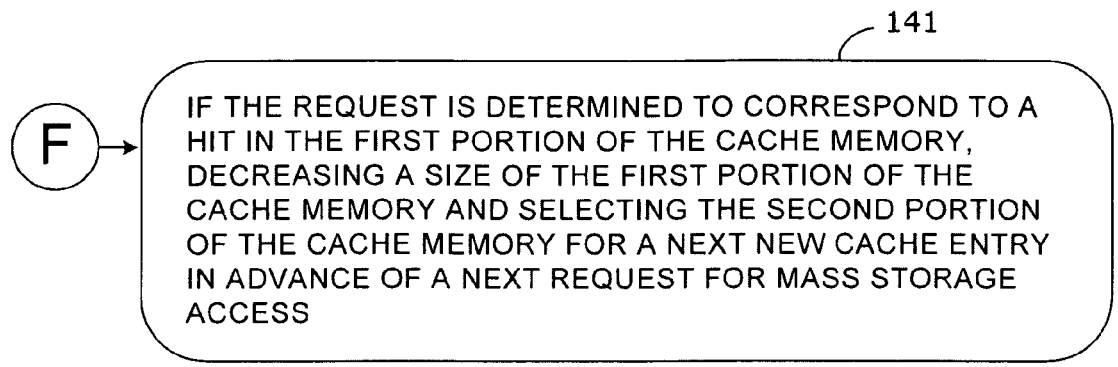
FIG. 14 is another flow diagram in accordance with some embodiments of the invention.

With reference to FIG. 14, some embodiments of the invention may further include, if the request is determined to correspond to a hit in the first portion of the cache memory, decreasing a size of the first portion of the cache memory and selecting the second portion of the cache memory for a next new cache entry in advance of a next request for mass storage access (e.g. at block 141).

Figure 15:
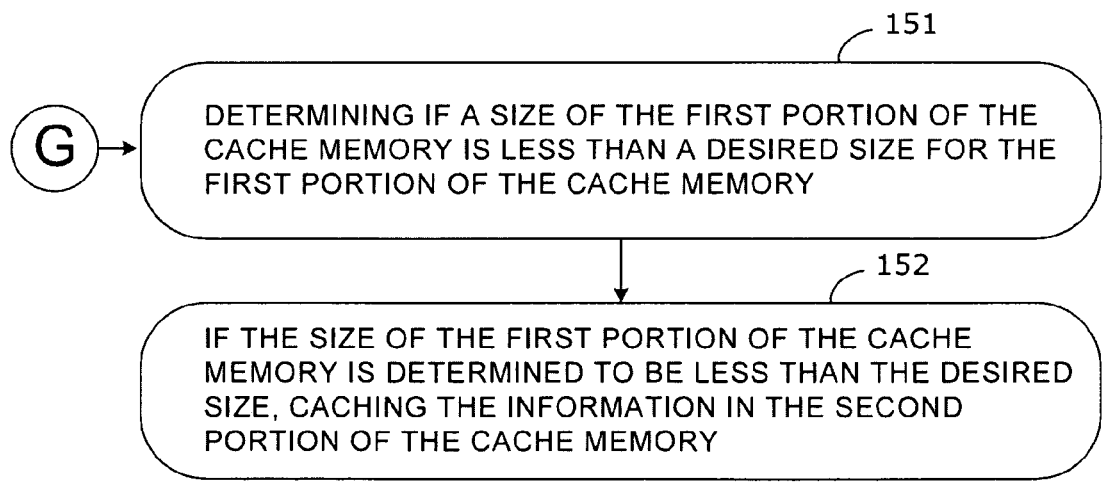
FIG. 15 is another flow diagram in accordance with some embodiments of the invention.

With reference to FIG. 15, some embodiments of the invention may further include determining if a size of the first portion of the cache memory is less than a desired size for the first portion of the cache memory (e.g. at block 151), and, if the size of the first portion of the cache memory is determined to be less than the desired size, caching the information in the second portion of the cache memory (e.g. at block 152).

Those skilled in the art will appreciate that, given the benefit of the present description, a numerous variety of other circuits and combinations of hardware and/or software may be configured to implement various methods, circuits, and systems in accordance with the embodiments described herein and other embodiments of the invention. The examples of FIGS. 1 through 15 are non-limiting examples of suitable embodiments.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A processor-based system, comprising:
    a processor:
    a system memory coupled to the processor;
    a mass storage device;
    a cache memory located between the system memory and the mass storage device wherein the cache memory includes at least a first cache portion having a first selected size of the cache memory, wherein the cache memory is logically divided into at least the first cache portion and a second cache portion;
    a computer readable storage medium having instructions, which, if executed by a processor, cause the processor-based system to store in the first cache portion cache entries having cache hits greater than or equal to one and less than or equal to a first selected number unless instructed otherwise;
    computer readable storage medium having instructions, which, if executed by a processor, cause the processor-based system to store in the second cache portion cache entries having cache hits greater than the first selected number—unless instructed otherwise; and
    computer readable storage medium having instructions, which, if executed by a processor, cause the processor-based system to store in the first cache portion a new cache entry unless instructed otherwise.

2. The processor-based system of claim 1, further comprising computer readable storage medium having instructions, which, if executed by a processor, cause the processor-based system to promote a cache entry from the first cache portion to the second cache portion when the number of cache hits for the cache entry exceeds the first selected number.

3. The processor-based system of claim 1, further comprising computer readable storage medium having instructions, which, if executed by a processor, cause the processor-based system to select whether to store a next new cache entry in the first cache portion or the second cache portion in advance of a next input/output request.

4. The processor-based system of claim 1, wherein the cache memory is further logically divided into at least a third cache portion, the processor-based system further comprising:
    computer readable storage medium having instructions, which, if executed by a processor, cause the processor-based system to store in the second cache portion cache entries having cache hits greater than the first selected number and less than or equal to a second selected number unless instructed otherwise; and
    computer readable storage medium having instructions, which, if executed by a processor, cause the processor-based system to store in the third cache portion cache entries having cache hits greater than the second selected number.

5. The processor-based system of claim 1, wherein the cache memory comprises a non-volatile cache memory.

6. The processor-based system of claim 1, wherein the first selected number of cache hits is one cache hit.

7. The processor-based system of claim 1, further comprising computer readable storage medium having instructions, which, if executed by a processor, cause the processor-based system to decrease a size of the first cache portion and select the second cache portion to store a next new cache entry in advance of a next request for mass storage access if a current request for mass storage access is determined to correspond to a hit in the first portion of the cache memory.

8. A non-volatile cache memory device, comprising:
a partitioned non-volatile cache memory; and
a controller coupled to the partitioned non-volatile cache memory,
wherein the partitioned non-volatile cache memory includes:
a provisional cache partition; and
a main cache partition,
wherein the controller is configured to preferentially store a new cache entry in the provisional cache partition, and
wherein the controller is configured to preferentially store cache entries having cache hits greater than or equal to one and less than or equal to a first selected number in the provisional cache partition.

9. The non-volatile cache memory device of claim 8, wherein the controller is further configured to promote a cache entry from the provisional cache partition to the main cache partition when the number of cache hits for the cache entry exceeds the first selected number.

10. The non-volatile cache memory device of claim 8, wherein the controller is further configured to select whether to store a next new cache entry in the provisional cache partition or the main cache partition in advance of a next input/output request.

11. The non-volatile cache memory device of claim 8, wherein the first selected number of cache hits is one cache hit.

12. A method of utilizing a cache memory, comprising:
preferentially storing a new cache entry in a first portion of a cache memory;
preferentially storing cache entries having cache hits greater than or equal to one and less than or equal to a first selected number in the first portion of the cache memory; and
preferentially storing cache entries having cache hits greater than the first selected number in a second portion of the cache memory.

13. The method of utilizing a cache memory of claim 12, further comprising:
promoting a cache entry from the first portion of the cache memory to the second portion of the cache memory when the number of cache hits for the cache entry exceeds the first selected number.

14. The method of utilizing a cache memory of claim 12, further comprising:
selecting whether to store a next new cache entry in the first portion of the cache memory or the second portion of the cache memory in advance of a next input/output request.

15. The method of utilizing a cache memory of claim 12, wherein the cache memory comprises a non-volatile cache memory.

16. The method of utilizing a cache memory of claim 12, wherein the selected number of cache hits is one cache hit.

17. The method of utilizing a cache memory of claim 12, further comprising:
receiving a request for mass storage access, the request requesting information to be accessed on a mass storage device;
determining if the request corresponds to a hit in the second portion of the cache memory;
if the request is determined to correspond to a hit in the second portion of the cache memory, performing the request from the second portion of the cache memory;
if the request is determined to not correspond to a hit in the second portion of the cache memory, determining if the request corresponds to a hit in the first portion of cache memory; and
if the request is determined to correspond to a hit in the first portion of the cache memory, performing the request from the first portion of the cache memory and promoting the corresponding cache entry to the second portion of the cache memory.

18. The method of utilizing a cache memory of claim 17, further comprising:
if the request is determined to correspond to a hit in the first portion of the cache memory, decreasing a size of the first portion of the cache memory and selecting the second portion of the cache memory for a next new cache entry in advance of a next request for mass storage access.

19. The method of utilizing a cache memory of claim 17, further comprising:
determining if a size of the first portion of the cache memory is less than a desired size for the first portion of the cache memory; and
if the size of the first portion of the cache memory is determined to be less than the desired size, storing a next new cache entry in the second portion of the cache memory.

* * * * *

UNITED STATES PATENT AND TRADEMARK OFFICE
CERTIFICATE OF CORRECTION

| | | |
|---|---|---|
| PATENT NO. | : 8,219,757 B2 | Page 1 of 1 |
| APPLICATION NO. | : 12/286460 | |
| DATED | : July 10, 2012 | |
| INVENTOR(S) | : Glenn Hinton et al. | |

It is certified that error appears in the above-identified patent and that said Letters Patent is hereby corrected as shown below:

In column 8, line 7, in claim 1, delete "processor:" and insert -- processor; --, therefor.

In column 8, line 26, in claim 1, delete "—unless" and insert -- unless --, therefor.

Signed and Sealed this
Ninth Day of October, 2012

David J. Kappos
*Director of the United States Patent and Trademark Office*